United States Patent [19]
Eriksson

[11] Patent Number: 5,366,337
[45] Date of Patent: Nov. 22, 1994

[54] ARTICULATED LOAD CARRIER FOR VEHICLES

[76] Inventor: Peter Eriksson, Box 4, S-810 20 Österfärnebo, Sweden

[21] Appl. No.: 949,527

[22] PCT Filed: Mar. 13, 1991

[86] PCT No.: PCT/SE91/00190
  § 371 Date: Nov. 13, 1992
  § 102(e) Date: Nov. 13, 1992

[87] PCT Pub. No.: WO91/14610
  PCT Pub. Date: Oct. 3, 1991

[30] Foreign Application Priority Data
  Mar. 20, 1990 [SE] Sweden .............. 9000983-8

[51] Int. Cl.⁵ .................................. B62D 53/00
[52] U.S. Cl. .................... 414/550; 280/400; 280/402; 280/404; 414/555
[58] Field of Search ............ 280/400, 404, 474, 492, 280/405.1; 180/14.4, 139; 414/546, 550, 555, 787

[56] References Cited

U.S. PATENT DOCUMENTS 3,603,464  9/1971  Teodorescu ............... 414/546
4,200,315  4/1980  Carlsson .................. 280/492

FOREIGN PATENT DOCUMENTS

90/02681  3/1990  WIPO ..................... 280/492

Primary Examiner—Mitchell J. Hill
Attorney, Agent, or Firm—Notaro & Michalos

[57] ABSTRACT

A load vehicle has a chassis (7) comprising a front chassis member (48) and a rear chassis member (49). These two chassis members are mutually pivotally interconnected through a hinge (51) forming a substantially vertical pivot axis. A load carrier arrangement is arranged on the rear chassis member (49). The rear chassis member (49) comprises two chassis portions (61, 62,) which are mutually pivotally interconnected through a hinge (63) forming a substantially vertical pivot axis. Each of these chassis portions (61, 62) has wheels or the like (3, 4 and 5, 6, respectively).

22 Claims, 7 Drawing Sheets

ARTICULATED LOAD CARRIER FOR VEHICLES

FIELD OF THE INVENTION AND PRIOR ART

This invention relates to a device for vehicles. The vehicle is in particular a load vehicle, which is especially adapted for cross-country driving. The vehicle may for example be a forest vehicle for transport of wood products or for carrying tree or tree trunk processors.

On such vehicles it is conventionally that the wheels, tracks or the like, generically contact elements, carrying the rear chassis member having the load carrier arrangement are arranged as bogies, i.e. with at least two wheels on each side of the vehicle suspended in a carrier pivotal on the vehicle, the pivot axis of which is located in the region between the axis of rotation of the two wheels. Accordingly, the wheels may not be steered, which gives rise to a considerable amount of friction between the wheels and the ground when the vehicle turns in a curve, since the wheels compulsorily have to be laterally dragged with respect to the ground so as to be able to follow the curve. This frictional resistance on taking curves will of course be as small as possible if the wheels are arranged so close together as possible on each side of the vehicle. However, this gives rise to a deteriorated capability to drive in cross-country, since the risk of that two bogie wheels on one side of the vehicle may simultaneously be received in a hole in the ground will increase, which may cause the vehicle to get stuck.

SUMMARY OF THE INVENTION

The object of the present invention is to start from the known art and show constructional solutions adapted to give the vehicle flexibility on taking curves and in other respects good driving manners.

This object is in accordance with the invention obtained by providing the device with the characteristics defined in the characterising parts of the appended claims.

Thanks to the pivotal interconnection of the two chassis portions forming the rear chassis member, these will be able to pivot with respect to each other at least slightly on taking curves, which considerably improves the flexibility of the vehicle and in particular results in that the wheel units located on the rear chassis member may be arranged at a considerably greater mutual distance than usual in so called bogie arrangements. The increased mutual distance between the wheels on each side of the vehicle increases its carrying capacity without deteriorating the curve flexibility.

It is preferred that the wheels of the vehicle are individually suspended by means of pivot arms vertically pivotal. Because of that it will be possible to have fairly great distance between the wheel units of the chassis portions on each side of the vehicle. Although wheels are the usual contact element of the invention, other contact elements may also be used, e.g. tracks.

The load carrier arrangement is advantageously arranged on the front and rear chassis portions of the rear chassis member in the way defined in one or several of the claims 6–11 and 15–27, whereby the load carrier arrangement may be efficiently carried by the chassis portions at the same time as they may pivot with respect to each other. It is preferred that power means are arranged for determining the pivot angle between the front and rear chassis portions of the rear chassis member.

A particularly uniform and smooth running on movement of the vehicle over an irregular ground is obtained when the device according to the invention is designed as defined more in detail in the appended claims 13 and 14.

BRIEF DESCRIPTION OF THE DRAWINGS

With reference to the appended drawings, below follows a specific description of embodiments according to the invention cited as examples.

In the drawings.

DETAILED DESCRIPTION OF THE EMBODIMENT ACCORDING TO FIGS. 1–7

Figure 1:
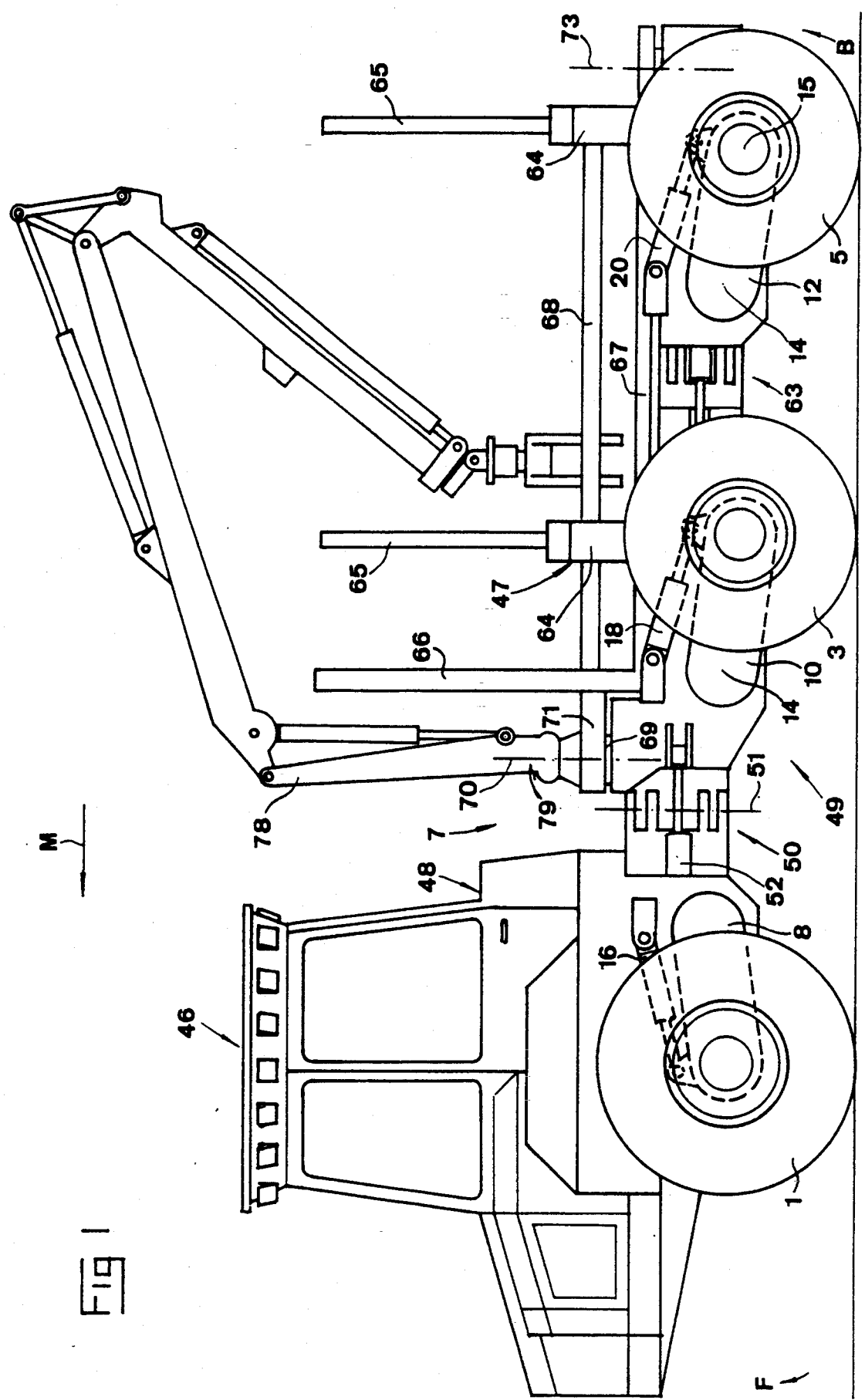
FIG. 1 is a side elevation of a six wheel vehicle constructed according to the invention.
Figure 2:
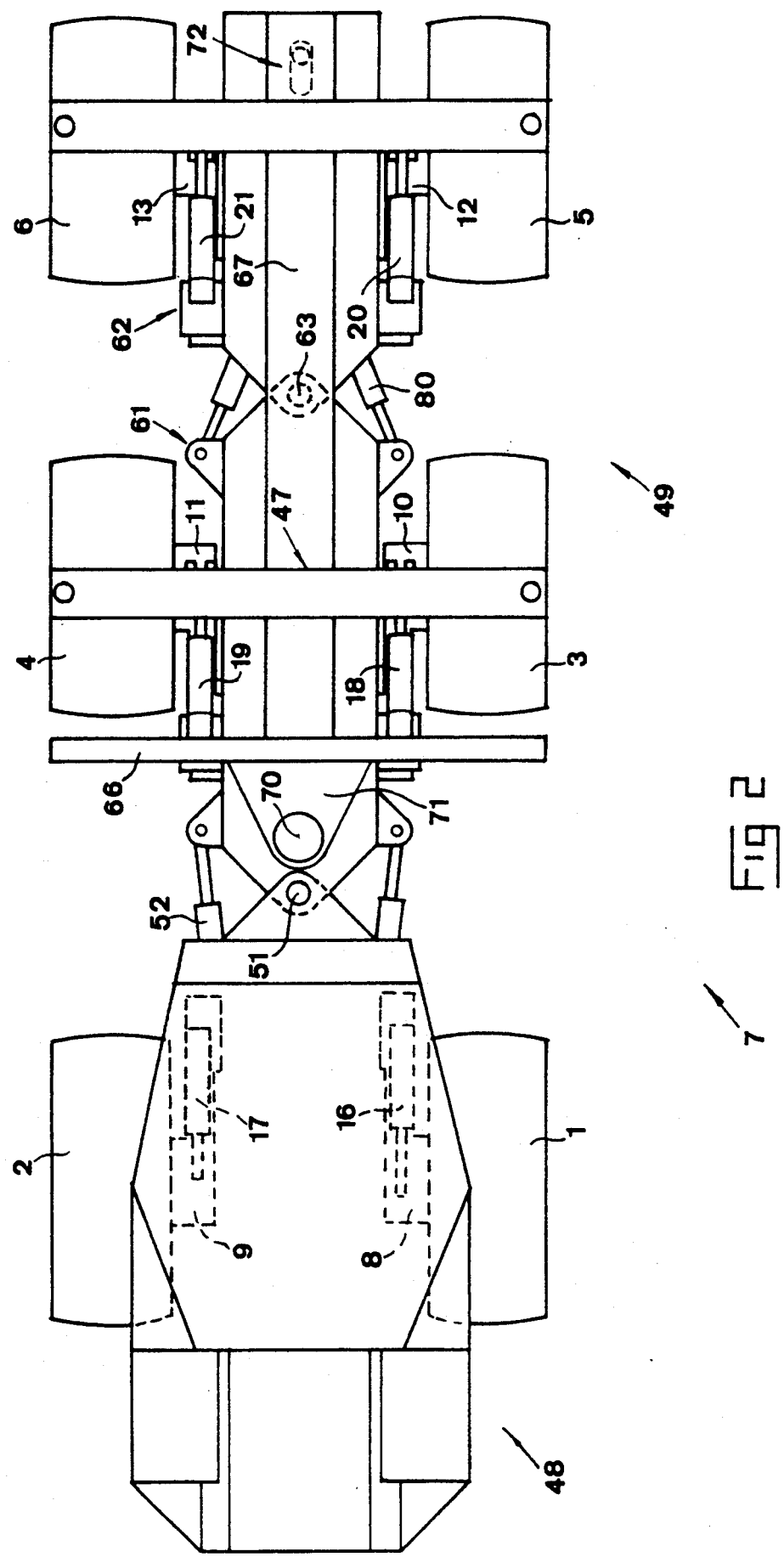
FIG. 2 is a view from above of the vehicle, but the crane is not shown.

The vehicle illustrated in FIGS. 1–5 is intended for cross country driving and has six wheels 1–6, three of which 1, 3, 5 and 2, 4, 6, respectively, are arranged on each longitudinal side of the vehicle. Each wheel is individually suspended in a chassis 7 of the vehicle by means of a respective vertically pivotal pivot arm 8–13. Thus, each of the pivot arms is pivoted with respect to the vehicle chassis 7 about an axis 14 extending substantially horizontally and transversally with respect to the longitudinal direction of the vehicle. Each separate wheel (see the wheel 5 in FIG. 1) is rotatably mounted in bearings on the respective pivot arm about an axle 15, which is located at a distance from the pivot axis 14 of the pivot arm and substantially parallel thereto. A motor, for instance an hydraulic motor for driving the wheel carried by the pivot arm in question, may be arranged on each of the pivot arms 8–13.

An hydraulic cylinder 16, 17, 18, 19, 20 and 21, respectively, is arranged between each of the pivot arms 8–13 and the vehicle chassis 7. Each of the hydraulic cylinders is in this example pivotally connected between the respective pivot arm and the vehicle chassis, so that on extension of an hydraulic cylinder the pivot arm associated therewith will be pivoted so that the vehicle chassis is lifted. As it primarily appears from FIG. 6, the hydraulic cylinders have two hydraulic fluid rooms 28–33 and 34–39, respectively, located on opposite sides of a piston 22–27 of the respective cylinder. In a first 28–33 of these rooms there is pressurized hydraulic fluid so as to counteract such pivoting of the pivot arm in question that the wheel arranged thereon is raised with respect to the vehicle chassis.

Although wheels are referred to, it should be understood that any other contact elements such as tracks, may also be used according to the present invention.

The pivot arms are in FIG. 1 illustrated in a position, in which the pivot arms extend substantially horizontally. The pivot arms may from this position by means of the hydraulic cylinders be pivoted downwardly with respect to the chassis about the axis 14, so that the vehicle chassis is raised with respect to the ground. The pivot arms may in an analogous way be pivoted at least slightly upwardly from the position according to FIG. 1, so that the vehicle chassis may be lowered with respect to the ground. These pivot movements may be obtained in a way known per se, so that the vehicle in an irregular or inclining country is positioned substantially horizontally. Since this technique is known per se, it will not be described more in detail.

The pivot arms 8–9 are so arranged that the wheel axle 15 as seen in the normal moving direction M of the vehicle is located in front of the pivot axis 14 of the corresponding pivot arm with respect to the chassis. However, the axles 15 are located behind the pivot axis 14 for the pivot arms 10–13.

Figure 6:
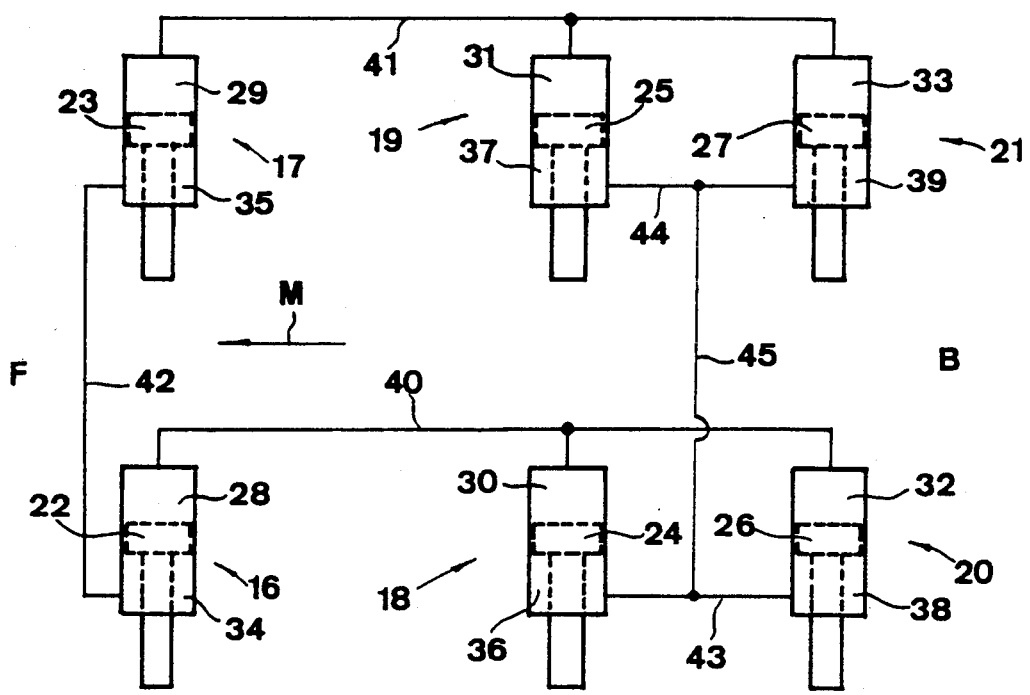
FIG. 6 is a circuit diagram showing the circuit of cylinders connected to wheel carrying pivot arms when the vehicle is intended to move over an irregular country.

The hydraulic cylinders 16–21 are for cross country driving coupled or may be coupled for mutual cooperation in the closed circuit illustrated in FIG. 6. The hydraulic fluid volume in the circuit is suitably so adjusted that the vehicle, when it is located on a ground being substantially horizontal, has its pivot arms 8–13 located in such an intermediate position that the pivot arms have freedom to move for pivoting downwardly as well as upwardly.

In the closed circuit according to FIG. 6 cylinders 16, 18, 20 and 17, 19, 21, respectively, of the pivot arms arranged on each side of the vehicle have their first chambers or rooms 28, 30, 32 and 29, 31, 33, respectively, communicating with each other by means of a conduit 40 and 41, respectively. However, the rooms or chambers 28, 30, 32 on one side of the vehicle are separated from the rooms or chambers 29, 31, 33 on the other side of the vehicle.

The front end of the vehicle is in FIG. 6 indicated by F, while the rear end is indicated by B. The wheels 1–6 suitably form three pairs, each of which has wheels arranged directly opposite each other on opposite sides of the vehicle. In this example the hydraulic cylinders 16, 17 for the two front pivot arms 8, 9 have their second hydraulic fluid rooms or chambers 34, 35 communicating with each other through a conduit 42. Furthermore, the two rear hydraulic cylinders 18, 20 and 19, 21, respectively, on each side of the vehicle are mutually interconnected by means of conduits 43 and 44, respectively, which establish communication between the second hydraulic fluid rooms 36, 38 and 37, 39, respectively, of the respective cylinder. Finally, there is a connection 45 joining the conduits 43, 44 and more exactly achieving that all the second rooms 36–39 of the four rear cylinders 18–21 communicate mutually.

A driver compartment 46, for instance a cabin, is in the example arranged close to the front end. In the region of the four rear pivot arms 10–13 the vehicle has a load carrier arrangement 47, which in the illustrated case of a wood transporting vehicle may comprise conventional timber embankments and posts.

The vehicle has a front member 48 and a rear member 49, said members being mutually interconnected by means of a hinge forming a substantially vertical axis 51. The members 48, 49 may by means of power means, for example hydraulic cylinders 52, be rotated with respect to each other about the axis 51 for steering the vehicle. The front member 48 has in this case two pivot arms 8, 9 carrying wheels, while the rear member 49 has four pivot arms 10–13 carrying wheels.

The closed circuit according to FIG. 6 functions in the following way on driving in an irregular country: when for instance the vehicle starts from a horizontal position according to FIG. 1 and drives over a stone or an elevation with the left front wheel 1, the corresponding pivot arm 8 will be pivoted upwardly with respect to the chassis while compressing the corresponding hydraulic cylinder 16. This means that hydraulic fluid from its room 28 is pressed through the conduit 40 into the rooms 30, 32 of the hydraulic cylinders 18, 20, so that the hydraulic cylinders 18, 20 are extended having a pivoting downwardly of the pivot arms 10, 12 with respect to the chassis as a result. An automatic balancing of the cylinders 18 and 20 takes place by the fact that the one indicated by 18 will be extended and accordingly pivot its pivot arm 10 downwardly more than the hydraulic cylinder 20. The volume of the rooms 36, 38 of the cylinders 18 and 20 is at the same time reduced, so that hydraulic fluid is pressed through the conduits 43, 45 and 44 into the rooms 37, 39 of the cylinders 19, 21 arranged on the other side of the vehicle. This gives rise to a shortening of the cylinders 19, 21 at the same time as hydraulic fluid from their rooms 31 and 33 is pressed through the conduit 41 into the cylinder 17 at the right front wheel, which causes this cylinder to be extended and presses the right front wheel downwardly against the ground, while hydraulic fluid from the cylinder 17 passes through the conduit 42 into the room 34 of the cylinder 16. Expressed in another way, the cylinder 16 of the wheel going over the stone will be shortened, the rear cylinders 18, 20 on the same side will be extended, the cylinders 19, 21 located opposite thereto on the other side of the vehicle will be shortened and the cylinder 17 opposite to the cylinder 16 on the other side of the vehicle will be extended. This means that the chassis 7 of the vehicle is not inclined to such a great extent that would be the case if the pivot arm 8 at the left side of the front of the vehicle had not been pivoted upwardly with respect to the chassis and if the pivot arms 10, 12 on the left side in the rear of the vehicle and the pivot arm 9 on the right side in the front of the vehicle had not been pivoted with respect to the vehicle chassis 7, so that this at these locations had been raised with respect to the ground. It appears that on each side of the vehicle hydraulic fluid from the two front hydraulic cylinders 16 and 17 will be distributed upon the rear hydraulic cylinders 18, 20 and 19, 21, respectively, when the front wheels 1, 2 drive over elevations and as a consequence of that the corresponding pivot arms 8, 9 are pivoted upwardly with respect to the vehicle chassis.

When one of the four rear wheels 3–6 drives over an elevation the following will take place: it is assumed that the wheel 3 on the pivot arm 10 is moving upwardly with respect to the chassis 7 as a result of a stone. Accordingly, hydraulic fluid is pressed from its cylinder 18 primarily into the room 38 of the cylinder 20, so that the cylinder 20 is extended. Depending on the load conditions it may occur that the cylinder 20 is extended substantially as much as the cylinder 18 is shortened, and in such a case the cylinders 18 and 20 will substantially give the pivot arms 10, 12 and the wheels associated therewith a character of an hydraulic bogie. Should hydraulic fluid from the room 30 also be transferred to the room 28 of the cylinder 16 this cylinder will be extended and hydraulic fluid is transferred into the room 35 in the cylinder 17 oppositely located, which has the consequence that this is shortened to a corresponding extent at the same time as hydraulic oil from its room 29 is transferred to the cylinders 19, 21 of the two right rear wheels 4, 6, so that these cylinders are slightly extended. At the same time hydraulic fluid is pressed from their rooms 37, 39 into the room 36 of the cylinder 18 (since in the practice also the cylinder 20 will be at least slightly extended).

It appears from above that independently of which of the wheels of the vehicle is moving upwardly because of an obstacle the resulting movement of the vehicle chassis 7 will be considerably smaller than the one which would be created in absence of the circuit enabling communication between the hydraulic cylinders in the way illustrated in FIG. 6.

Figure 7:
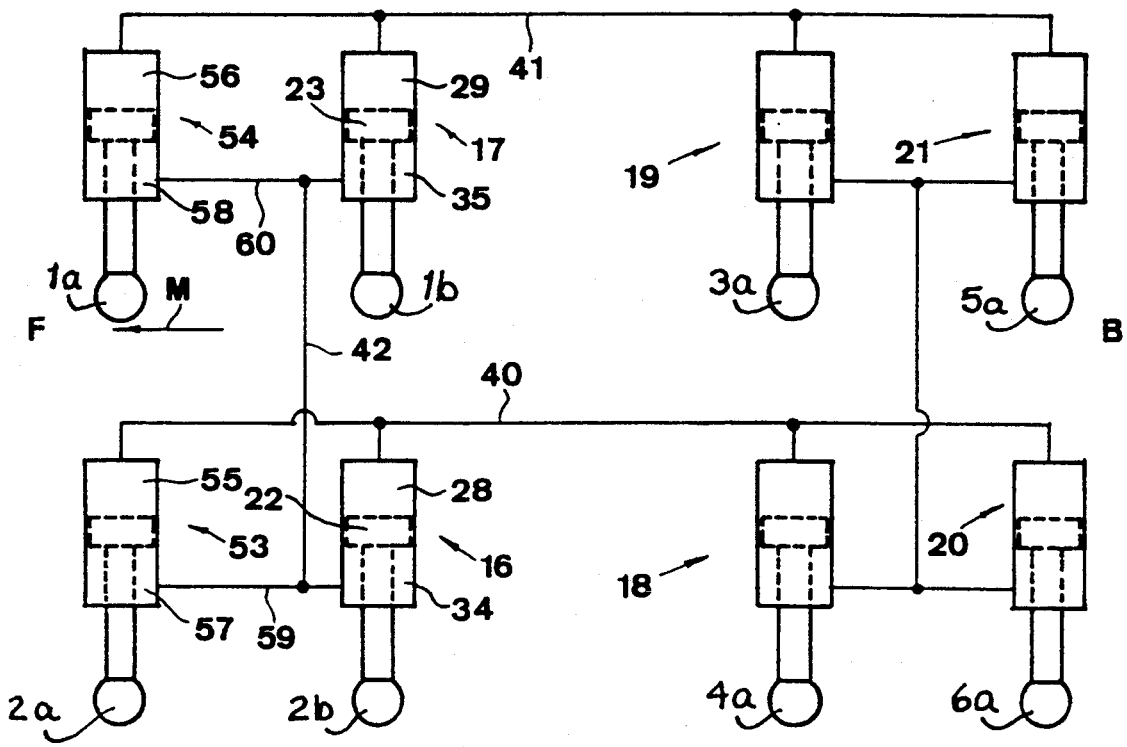
FIG. 7 is a circuit diagram similar to FIG. 6 but illustrating the device on an eight wheel vehicle.

The embodiment according to FIG. 7 corresponds to the one illustrated in FIG. 6 excepted for that two further cylinders 53, 54 are illustrated here, which in the practice could be arranged on the front vehicle member 43 illustrated in FIG. 1 besides the cylinders 16 and 17 already located there. The cylinders 53 and 54 cooperates in an analogous way with pivot arms, which carry wheels and are constructed in principally the same way as the pivot arms 8–13 described above. The hydraulic fluid rooms 55, 56 of the cylinders 53, 54 are through conduits 40 and 41, respectively, united with the other corresponding hydraulic fluid rooms of the cylinders on the same respective side of the vehicle. The other hydraulic fluid rooms 57 and 58, respectively, in the cylinders 53, 54 are through conduits 59 and 60, respectively, united with the second hydraulic fluid rooms 34 and 35, respectively, of the adjacent cylinders 16 and 17, respectively. As before there is the connection 42, which connects all second hydraulic fluid rooms 34, 35, 57, 58 in the cylinders belonging to the four front pivot arms carrying wheels of the vehicle together.

The function of the embodiment according to FIG. 7 corresponds principally to the one already described by means of FIG. 6 with the exception that the four cylinders 16, 17 and 53, 54 for the four front pivot arms of the vehicle will also function as hydraulic bogie in a similar way as described for the four cylinders 18–21 for the four rear pivot arms 10–13 carrying wheels in the embodiment according to FIG. 6. In FIG. 7 eight wheels or the like are shown schematically at 1a, 1b, 2a, 2b, 3a, 4a, 5a and 6a. The eight wheels or the like, correspond to eight contact elements which is the generic term given to wheels, tracks or the like used in the present invention.

The rear chassis member 49 comprises two chassis portions 61, 62, namely a front 61 and a rear 62, which are mutually pivotally interconnected through a hinge 63 forming a substantially vertical pivot axis. The front chassis portion 61 has pivot arms 10, 11 and the wheels 3, 4 carried thereby, while the rear chassis portion 62 has pivot arms 12, 13 and wheels 5, 6.

As it appears most clearly from FIG. 1, the pivot arms 10, 11 and 12, 13, respectively, on the chassis portions 61, 62 of the rear chassis member 49 are facing or directed in the same direction, namely rearwardly. The pivot arms 8, 9 on the front chassis member 48 are directed forwardly in the normal driving direction of the vehicle. The words "forwardly" and "rearwardly" concern the main direction of the pivot arms from their pivot axis 14 and to their free ends, and it is of course comprised that the pivot arms may be more or less inclined with respect to the horizontal plane.

In order to obtain a favourable carrying capacity it is preferred that the pivot arms 10, 11 on the front portion 61 of the rear chassis member 49 have their pivot axis 14 located close to the front end of the last mentioned chassis portion 61. Also the pivot arms 12, 13 on the rear chassis portion 62 have their pivot axis 14 arranged at the front end of the rear chassis portion.

Figure 4:
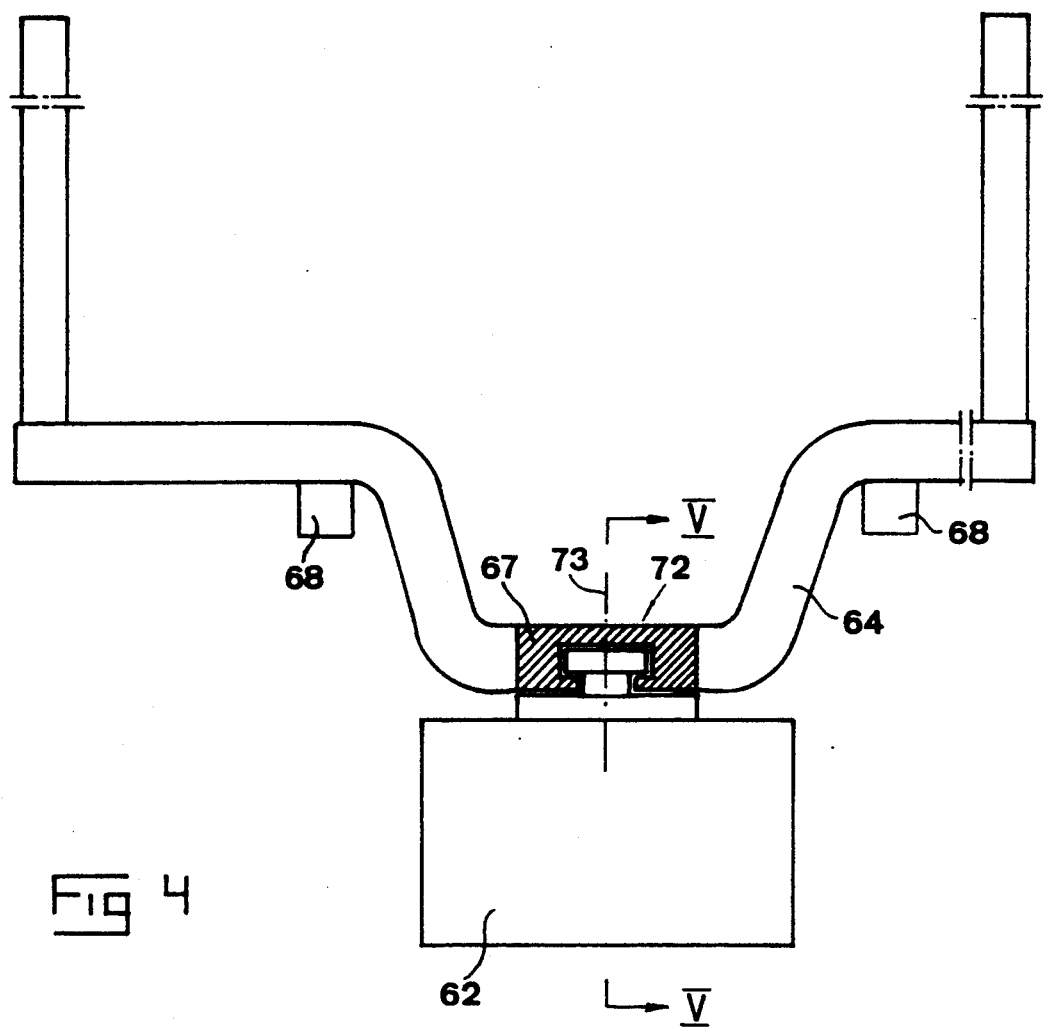
FIG. 4 is a schematic and partially sectional view of the vehicle as seen from behind, i.e. from the right in FIG. 1.
Figure 5:
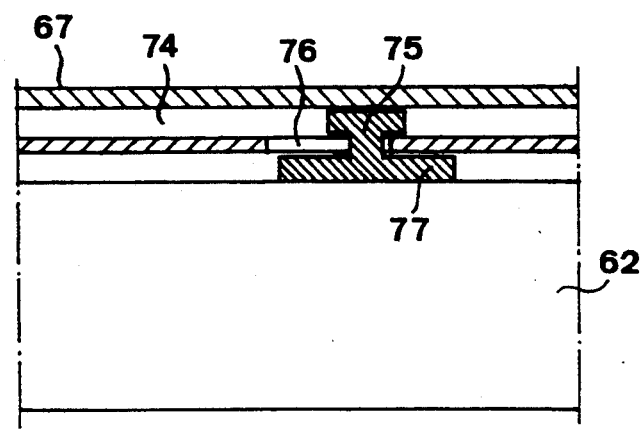
FIG. 5 is a section taken along V—V in FIG. 4.

The load carrier arrangement 47 comprises in this example the timber embankments 64 and posts 65 already mentioned. The arrangement 47 may also comprise a conventional gate 66, a central longitudinal beam 67 and two further longitudinal beams 68 (FIG. 4). It will be suitable to have the embankments 64 displaceable along the beams 67, 68 and securable in desired positions, although this does not appear from FIG. 4. It is preferred that the load carrier arrangement 47 forms a rigid continuous unit.

The load carrier arrangement 47 is rotatably connected to the chassis portion 61 by means of a connection 69 forming a substantially vertical axis of rotation 70. The arrangement 47 comprises a portion 71 projecting in front of the gate 66, said connection 69 being arranged at this portion. It is for the rest located in the proximity of the front end of the chassis portion 61, for instance immediately behind the axis of rotation 51.

Furthermore, the arrangement 47 is rotatably connected to the chassis portion 62 by means of a connection 72 (FIGS. 2 and 4) forming a substantially vertical axis of rotation 73. The connection 72 is arranged in the region of the rear end of the arrangement 47 and of the chassis portion 62.

At least one of the connections 69, 72 are arranged to allow relative movement of the arrangement 47 and the chassis portion in question in the longitudinal direction of the arrangement 47 or the chassis portion. In this example the rear connection 72 is the one that is designed to allow this longitudinal movement.

The connection 72 comprises a first connecting means 74 on the load carrier arrangement 47 and a second connecting means 75 on the chassis portion 62. The means 74 has the form of a guide extending along the arrangement 47, along which guide the means 75 is displaceably movable on relative pivoting of the chassis portions 61 and 62. The guide 74 is in the example arranged in the beam 67 of the load carrier arrangement. This may have the character of a box girder, which have an internal room and a slit 76 in its lower wall. The means 75 has the character of an extension fixed on the chassis portion 62, said extension having a shaft portion received in the slit 76 and a head having a larger width than the slit 76 and being received in the internal room of the beam 67. The shaft portion of the extension 75 forms in cooperation with the slit 76 the vertical axis of rotation 73 and the head of the extension cooperates with a portion of the beam 67 adjacent to the slit 76 so as to establish a connection preventing the load carrier arrangement from tilting laterally with respect to the chassis portion 62.

The chassis portion 62 is arranged to support a projecting portion of the load carrier arrangement 47 from below. In this example a support plate 77 is arranged on the chassis portion 62 and the beam 67 bears displaceably thereon.

As it appears from FIG. 1, the vehicle has a loading crane 78. This has a base member 79 which is rotatable about a substantially vertical axis. It is intended that this axis in this example coincides with the axis 70. The device may be such that the load carrier arrangement 47 is rotatable with respect to the chassis portion 61 by means of a suitable axis arrangement and furthermore, the crane 78 is rotatably carried by the load carrier arrangement 47, more exactly by its front portion 71. However, a device may also be such that the crane 78 is not carried by the load carrier arrangement 47 but by an axis arrangement secured on the chassis portion 61 and projecting through the load carrier arrangement 47. However, it is advantageous that the crane 78 is so connected to the load carrier arrangement 47, for instance by being mounted on this, that the crane 78 follows the load carrier arrangement 47 in the rotational movement thereof about the axis of rotation 70.

To this point of the description it appears that the load carrier arrangement 47 would have a free bearing extension between the connection 69, 72. However, further support points may be arranged between the load carrier arrangement 47 and the chassis portion 61 and/or chassis portion 62, but these support points have to be designed so as to allow relative movement in the lateral direction of the vehicle between the load carrier arrangement and the respective chassis portions 61, 62.

Figure 3:
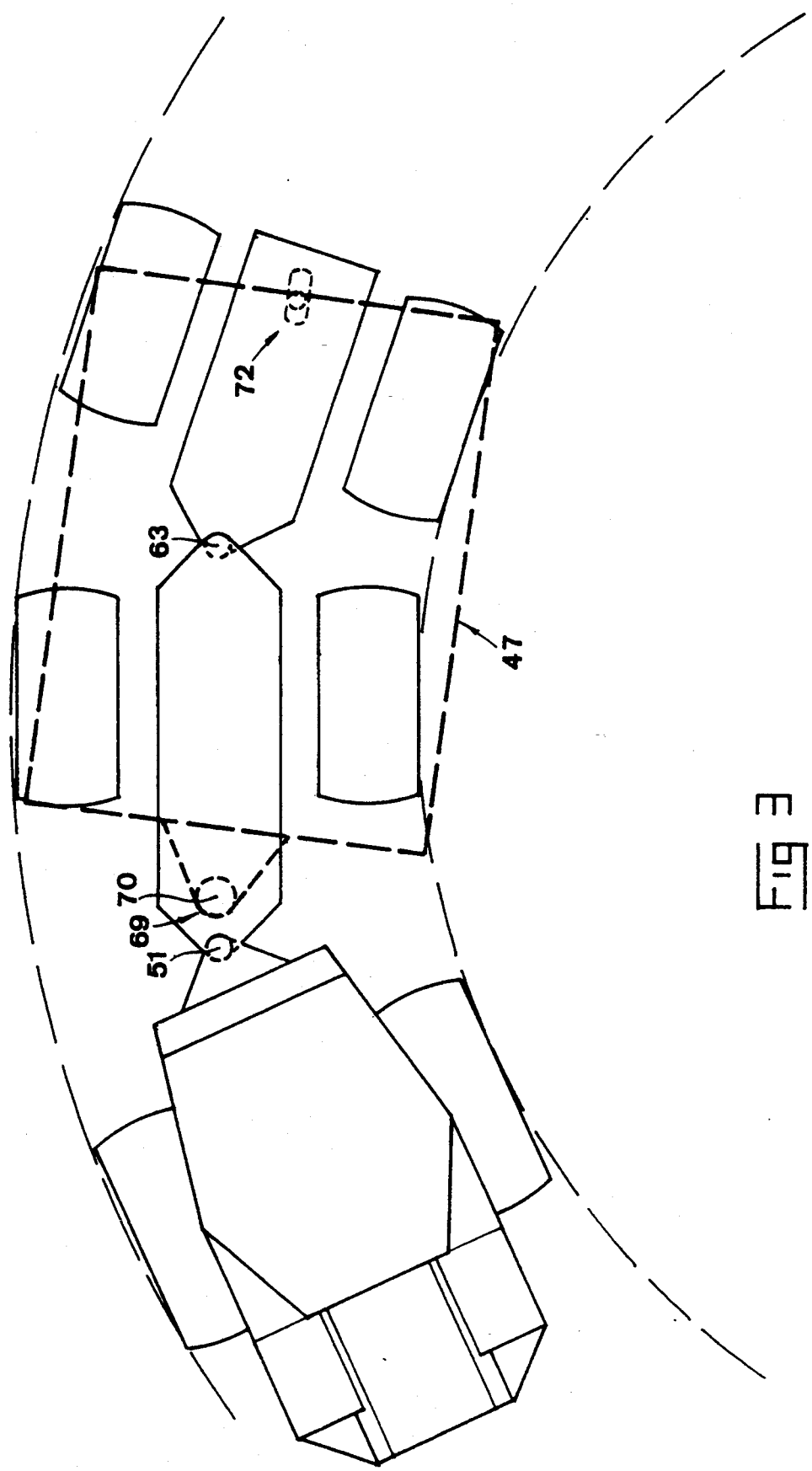
FIG. 3 is a schematic view similar to FIG. 2 but illustrating the vehicle when it turns.

It appears from FIG. 3 how the axis of rotation 51 and 63 give the vehicle excellent driving manners, since its wheels on each side of the vehicle will carefully follow one turning radius each. Furthermore, it appears from FIG. 3 how the chassis portions 61 and 62 between the connections 69 and 72 will move laterally with respect to the arrangement 47 on taking curves.

It is preferred that the hinge 63 and preferably also the hinge 50 only allow rotation about a substantially vertical axis, i.e. not any rotation about any substantially horizontal axis.

Power means 80, for instance hydraulic cylinders, act between the two chassis portions 61, 62 for determining the pivot angle therebetween. The power means 80 are suitably adjustable in a "floating position", in which they allow free relative pivot movement between the chassis portions 61 and 62. The power means 80 are furthermore arranged to by force pivot the chassis portions 61 and 62 with respect to each other in dependence of the pivot movement desired by the driver. A controlling apparatus acting automatically may be arranged to control the power means 80 to adjust the pivot angle between the chassis portions 61 and 62 in the same respect as the pivot angle produced by the power means 52 between the front chassis member 48 and the front chassis portion 61, but preferably so that the first mentioned pivot angle is smaller than the last mentioned one.

DETAILED DESCRIPTION OF THE EMBODIMENT ACCORDING TO FIGS. 8 AND 9

Figure 8:
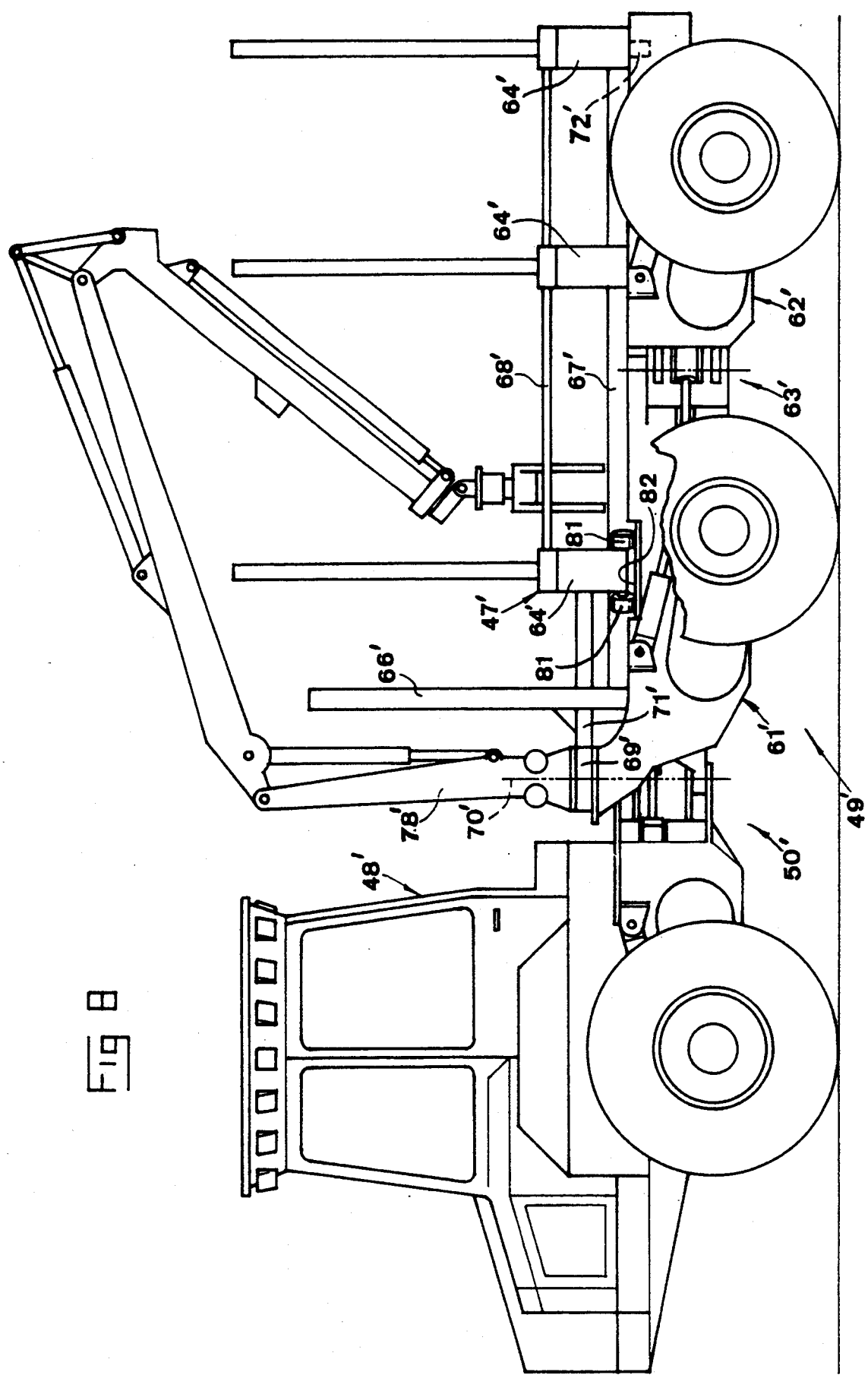
FIG. 8 is a view similar to FIG. 1 of a slightly modified embodiment and FIG. 9 is a purely schematic view illustrating a part of the vehicle according to FIG. 8 from above, some parts being cut away or omitted.
Figure 9:
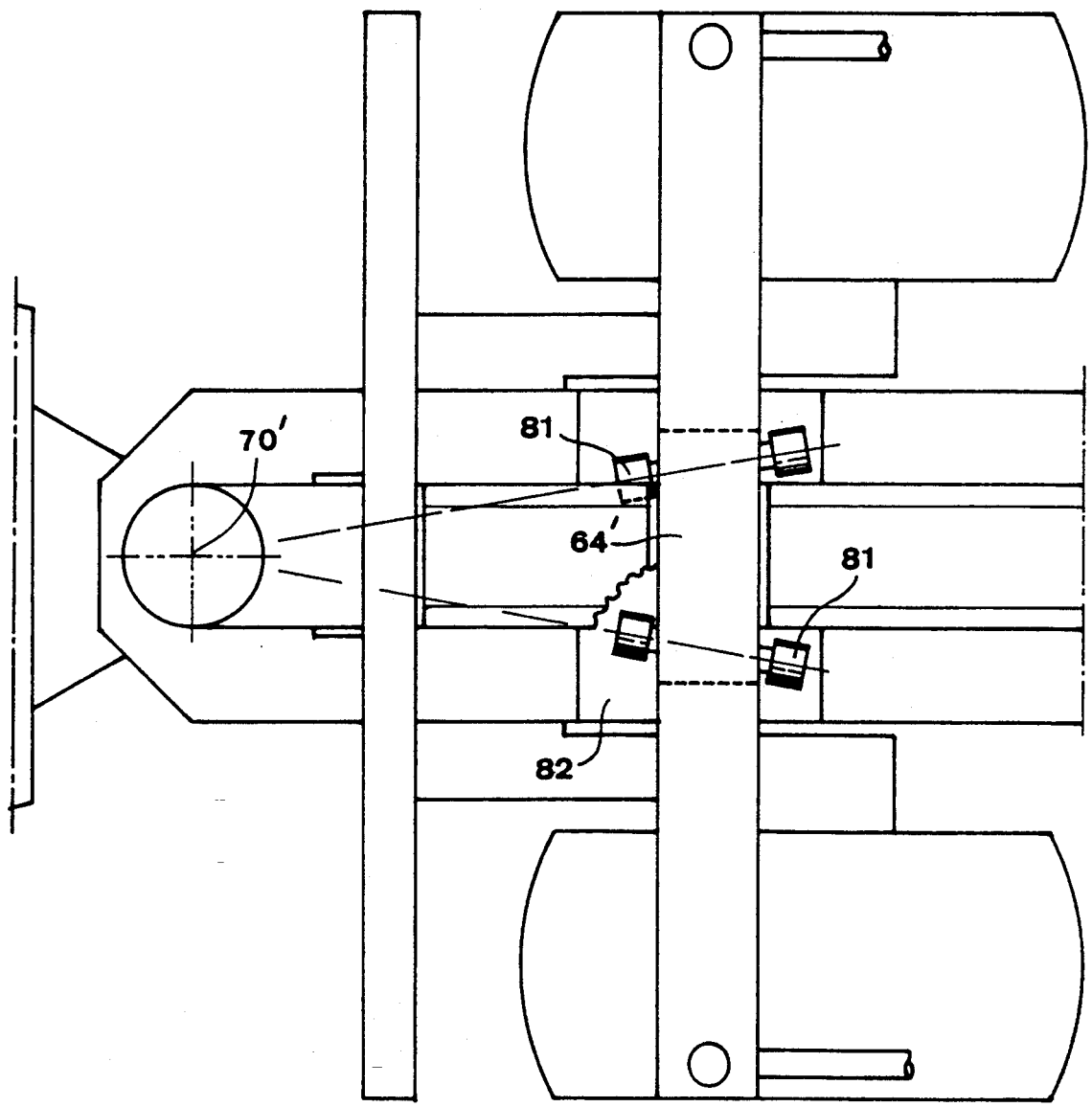

With the exception of the points which will be described closer, the embodiment according to FIGS. 8–9 corresponds completely to the previous embodiment and in the corresponding parts the same or similar reference numerals will be used. The vehicle has as before a load carrier arrangement 47 forming a rigid continuous unit. This comprises as in the previous embodiment load embankments 64' which here are three in number, a gate 66' and stiffening beams 67', 68'. The connection 69', which forms the substantially vertical axis of rotation 70' between the load carrier arrangement 47' and the front chassis portion 61' of the rear chassis member 49 is as before arranged at a portion 71' of the load carrier arrangement projecting in front of the gate 66' and furthermore so located that the axis 70' is concentric or almost concentric to the vertical axis of rotation formed by the hinge 50' between the front chassis member 48' and the front chassis portion 61 of the rear chassis member. The loading crane 68' is as before connected to the load carrier arrangement 47' so as to follow this in the relative rotating movement between this and the chassis portion 61'. Since the connection 69' is arranged at the front end of the front chassis portion 61' of the rear chassis member and the other connection 72' (compare connection 72 with FIGS. 2 and 3) is arranged at the rear end of the rear chassis portion 62' of the rear chassis member and, accordingly, the distance may be considerable between the connection 69' and 72', the load carrier arrangement 47' is supported between the first and second connections with respect to the front and/or rear chassis portion 61', 62' of the rear chassis member 49' by means of support means 81. Such support means 81 is illustrated in the example as acting between the load carrier arrangement and the front chassis portion 61', but similar support means could also be arranged between the load carrier arrangement and the rear chassis portion 62'. The support means 61' suitably consist of rollers, which may be arranged in connection with one of the embankments 64', suitably the foremost. These rollers 81 are in the example arranged on the load carrier arrangement so as to rolingly contact support surfaces 82 on the front chassis portion 61'. It is preferred that the axes of rotation of the rollers at least substantially intersect the substantially vertical axis of rotation 70' (FIG. 9) formed by the first connection 69', whereby a regular rolling contact will be established between the rollers 81 and their supporting surfaces 82. A condition for the function aimed at is that the hinge 63' between the front and rear chassis portions 61' and 62' of the rear chassis member 49' only allow relative movement about a substantially vertical axis and not any relative rotation about any horizontal axis. The corresponding is for the rest valid also for the hinge 50'.

Thus, the load carrier arrangement 47' will in other words be supported by the vehicle at its front and rear ends by means of the first and second connection, and the support means or wheels 81 exert a bearing function against the chassis of the vehicle therebetween.

POSSIBLE MODIFICATIONS OF THE INVENTION

The device described may of course be modified in several ways within the scope of the inventional idea. Instead of wheels 1–6 the vehicle may for instance have tracks known per se or arbitrary ones for contact against the ground. The term "contact elements" is used here to generically refer to wheels, tracks or the like. Finally the load carrier arrangement 47 or 47' may have a very varying character. It could for instance have the character of a wagon-bridge or a container or any other carrier for an arbitrary load, e.g. machine equipment, such as forestry machines etc., arranged more or less stationary thereon.

I claim:

1. A device for a load vehicle having a chassis (7) comprising a front member (48') having contact elements (1, 2) and a rear member (49') having contact elements (3–6), said front and rear members being mutually pivotally interconnected by a first hinge (50') forming a first substantially vertical pivot axis (51'), a load carrier arrangement (47') on the rear chassis member (49'), the rear chassis member (49') comprising a front chassis portion (61') and a rear chassis portion (62'), which are mutually pivotally interconnected by a second hinge (63') forming a second substantially vertical pivot axis, each of said chassis portions (61', 62') having contact elements (3, 4; 5, 6), the device comprising: the load carrier arrangement (47') being rotatably connected to the front chassis portion (61') of the rear chassis member (49') by means of a first connection (69') comprising a first substantially vertical axis of rotation (70'), the load carrier arrangement (47') being rotatably connected to the rear chassis portion (62') of rear chassis member (49') by means of a second connection (72') forming a second substantially vertical axis of rotation (73'), at least one of the first and second connections being structured to allow relative movement of the load carrier arrangement (47') and an associated chassis portion in a longitudinal direction of one of the load carrier arrangement and the associated chassis portion, and support means (81) engaged to the load carrier arrangement for supporting the load carrier arrangement at a location between the first and second connections (69', 72'), the support means being engaged to and supported by at least one of the front and rear chassis portion (61', 62') of the rear chassis member (49').

2. A device according to claim 1, wherein the support means comprises rollers (81).

3. A device according to claim 2, wherein the rollers are mounted to the load carrier arrangement (47').

4. A device according to claim 2, wherein rollers have an axis of rotation which intersects the first substantially vertical axis of rotation (70') formed by the first connection (69').

5. A device according to claim 1, including a vertically pivotal pivot arm (8, 9) connected between each of the contact elements (1, 2) and the front chassis member (48') for individually suspending the contact elements of the front chassis member.

6. A device according to claim 1, including a respective vertically pivotal pivot arm (10–13) connected to a respective one of the contact elements (3–6) of the front and rear chassis portions, wherein the contact elements (3–6) of the front and rear chassis portions (61', 62') of the rear chassis member (49') are individually suspended by means of the respective vertically pivotal pivot arms (10–13).

7. A device according to claim 6, wherein the pivot arms (10–13) on the chassis portions (61', 62') of the rear chassis member are directed substantially rearwardly between the chassis portions and respective contact elements.

8. A device according to claim 6, wherein the pivot arms (8, 9) on the front chassis member (48') are directed substantially forwardly between the front chassis member and respective contact elements.

9. A device according to claim 6, wherein the pivot arms (10, 11) on the front chassis portion of the rear chassis member have each pivot axis located close to a front end of the front chassis portion.

10. A device according to claim 6, wherein the pivot arms (12, 13) on the rear chassis portion of the rear chassis member have each pivot axis arranged at a front end of the rear chassis portion.

11. A device according to claim 1, wherein the at least one of the first and second connections allowing the relative longitudinal movement is the second connection between the load carrier arrangement and the rear chassis portion (62') of the rear chassis member.

12. A device according to claim 1, wherein the at least one of the first and second connections allowing relative longitudinal movement comprises a first connecting means (74, 76) on the load carrier arrangement and a second connecting means (75) on the associated chassis portion, and the first connecting means comprises a guide, along which the second connecting means is displaceably movable.

13. A device according to claim 1, wherein the rear chassis portion of the rear chassis member is arranged to support a projecting portion of the load carrier arrangement.

14. A device according to claim 1, including power means (80) connected between the chassis portions for changing a pivot angle between the front and rear chassis portions of the rear chassis member.

15. A device according to claim 1, wherein the load vehicle has a loading crane (78) which is connected to the load carrier arrangement so as follow it in its rotational movement about the first substantially vertical axis of rotation formed by the first connection between the load carrier arrangement and the front chassis portion of the rear chassis member.

16. A device according to claim 15, wherein the loading crane (78) is rotatably carried by the load carrier arrangement.

17. A device according to claim 16, wherein the loading crane (78) is arranged on a front portion of the load carrier arrangement.

18. A device according to claim 15, wherein the load carrier arrangement comprises timber embankments (64') and a gate (66') and the loading crane (78) is rotatably carried by the load carrier arrangement by means of a portion (71') thereof projecting in front of the gate (66').

19. A device according to claim 1, wherein the first connection is located close to a front end of the front chassis portion of the rear chassis member.

20. A device according to claim 1, wherein the load carrier arrangement is a rigid unit.

21. A device for a load vehicle having a chassis (7) comprising a front member (48') having contact elements (1, 2) and a rear member (49') having contact elements (3–6), said front and rear members being mutually pivotally interconnected by a first hinge (50') forming a first substantially vertical pivot axis (51'), a load carrier arrangement (47') on the rear chassis member (49'), the rear chassis member (49') comprising a front chassis portion (61') and a rear chassis portion (62'), which are mutually pivotally interconnected by a second hinge (63') comprising a second substantially vertical pivot axis, each of said chassis portions (61', 62') having contact elements (3, 4; 5, 6), the device comprising: at least six contact elements connected to the vehicle, at least three of the contact elements (1, 3, 5; 2, 4,6) being arranged on each side of the vehicle and each being individually suspended on the chassis (7) of the vehicle by means of a respective vertically pivotal pivot arm (8–13), a hydraulic cylinder (16–20) connected between each of the contact elements and the vehicle chassis, each cylinder having two hydraulic fluid chambers (28–33; 34–39) located on opposite sides of a piston of the hydraulic cylinder, hydraulic fluid being compressed in a first (28–33) of the chambers so as to counteract such pivoting of the corresponding pivot arm that the contact element thereon is raised with respect to the vehicle chassis, the hydraulic cylinders (16–21) being coupled for mutual cooperation in a closed circuit in which the cylinders of the pivot arms (8, 10, 12; 9,11, 13) arranged on each side of the vehicle have their first chambers (28, 30, 32; 29, 31, 33) communicating with each other, at least two hydraulic cylinders (16, 17) for at least two pivot arms (8, 9) being arranged on opposite sides of the vehicle closer to a first end (F) of the vehicle than to a second end (B) of the vehicle, having their second hydraulic fluid chambers (34, 35) communicating with each other, at least two hydraulic cylinders (18, 20; 19, 21) for further pivot arms (10, 13; 11 13) on each side of the vehicle having their second chambers (36, 38; 37, 39) communicating with each other as well as with the second chambers (37, 39; 36, 38) of at least two hydraulic cylinders (19, 21; 18, 20) arranged on the opposite side of the vehicle.

22. A device according to claim 21, having at least eight contact elements at least four of which are arranged on each side of the vehicle, the hydraulic cylinders of the pivot arms arranged on each side of the vehicle having their first chambers (55, 28,30, 32; 56, 29, 31, 33) communicating with each other.

* * * * *